United States Patent
Pantalone, III et al.

(10) Patent No.: US 9,297,290 B2
(45) Date of Patent: Mar. 29, 2016

(54) ROTARY WING AIRCRAFT HAVING COLLOCATED EXHAUST DUCT AND PROPELLER SHAFT

(71) Applicant: Sikorsky Aircraft Corporation, Stratford, CT (US)

(72) Inventors: Joseph Pantalone, III, Guilford, CT (US); John S. Chapkovich, III, Derby, CT (US); Ashley Devito, Newtown, CT (US); Erez Eller, Oakville, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 143 days.

(21) Appl. No.: 14/049,662

(22) Filed: Oct. 9, 2013

(65) Prior Publication Data

US 2014/0217231 A1 Aug. 7, 2014

Related U.S. Application Data

(60) Provisional application No. 61/711,941, filed on Oct. 10, 2012.

(51) Int. Cl.

| | |
|---|---|
| *B64C 27/00* | (2006.01) |
| *F01N 5/04* | (2006.01) |
| *B64C 27/10* | (2006.01) |
| *B64C 27/14* | (2006.01) |
| *B64D 33/04* | (2006.01) |
| *B64D 35/00* | (2006.01) |
| *B64C 27/82* | (2006.01) |

(52) U.S. Cl.
CPC . *F01N 5/04* (2013.01); *B64C 27/10* (2013.01); *B64C 27/14* (2013.01); *B64C 27/82* (2013.01); *B64C 2027/8236* (2013.01); *B64C 2027/8272* (2013.01); *B64D 33/04* (2013.01); *B64D 35/00* (2013.01); *B64D 2033/045* (2013.01)

(58) Field of Classification Search
CPC .. B64C 27/82; B64C 2025/325; B64C 25/52; B64C 2700/6281; B64C 9/38; F01D 25/30; Y02T 50/671; Y02T 50/675; F02K 1/825; F02K 1/822
USPC ............ 244/17.21, 17.19, 17.17, 52; 60/39.5, 60/264; 239/127.3
See application file for complete search history.

(56) References Cited

U.S. PATENT DOCUMENTS

| | | | | |
|---|---|---|---|---|
| 3,540,680 | A * | 11/1970 | Peterson | 244/17.19 |
| 3,815,360 | A * | 6/1974 | Wellinitz | 60/264 |
| 4,660,785 | A * | 4/1987 | Munski | 244/17.19 |
| 4,913,354 | A * | 4/1990 | Woodward | 239/265.35 |
| 5,131,603 | A * | 7/1992 | Meyers | 244/17.19 |
| 5,205,512 | A * | 4/1993 | Rumberger | 244/17.19 |
| 5,699,965 | A * | 12/1997 | Amelio | 239/127.3 |

(Continued)

FOREIGN PATENT DOCUMENTS

WO WO 2007106188 A2 * 9/2007

*Primary Examiner* — Brian M O'Hara
*Assistant Examiner* — Assres H Woldemaryam
(74) *Attorney, Agent, or Firm* — Cantor Colburn LLP (57) ABSTRACT

An exhaust system for reducing infrared emissions of a rotary wing aircraft includes an exhaust duct having a fore end for connection with an aft turbine section of an engine of the rotary wing aircraft, the exhaust duct having an aft end having an exhaust opening to expel engine exhaust proximate to a tail fairing of the rotary wing aircraft; and a drive shaft collocated with the exhaust duct, the drive shaft configured to provide rotational force to an aft propeller of the rotary wing aircraft.

21 Claims, 6 Drawing Sheets

(56) References Cited

U.S. PATENT DOCUMENTS

| | | | |
|---|---|---|---|
| 6,098,921 A * | 8/2000 | Piasecki | 244/17.19 |
| 6,886,777 B2 * | 5/2005 | Rock | 244/17.23 |
| 7,823,375 B2 * | 11/2010 | Zack et al. | 60/39.5 |
| D665,720 S * | 8/2012 | Stille et al. | D12/326 |
| 8,636,242 B2 * | 1/2014 | Smith | 244/17.19 |
| 2009/0025362 A1 | 1/2009 | Chapkovich et al. | |
| 2012/0318911 A1 * | 12/2012 | Robertson | 244/52 |

\* cited by examiner

ROTARY WING AIRCRAFT HAVING COLLOCATED EXHAUST DUCT AND PROPELLER SHAFT

CROSS REFERENCE TO RELATED APPLICATION

This application claims priority to U.S. provisional application Ser. No. 61/711,941 filed Oct. 10, 2012, the entire contents of which are incorporated herein by reference.

FIELD OF INVENTION

The subject matter disclosed herein relates generally to rotary wing aircraft and, more particularly, to a rotary wing aircraft having a collocated exhaust duct and propeller shaft.

DESCRIPTION OF RELATED ART

The exhaust ducting from a gas turbine engine of a rotary wing aircraft is a source of infrared (IR) energy which may be detected by heat seeking missiles and/or various forms of infrared imaging systems for targeting/tracking purposes. With respect to the former, generally speaking, a heat-seeking missile obtains directional cues from the infrared energy generated by the engine exhaust such that the amount of infrared energy given off is one of the primary determining factors of missile accuracy. Regarding the latter, infrared imaging systems detect and amplify the infrared energy for detection and/or targeting.

Current IR suppression systems are utilized on many military aircraft including rotary wing aircraft to provide IR signature reduction. Future IR threats, however, will require even greater levels of IR signature reduction. Generally, IR suppression systems are designed to: (a) reduce the infrared energy below a threshold level of a perceived threat; (b) maintain engine performance; and (c) reduce weight and packaging associated therewith. Other consequences may include: (i) reducing system or configuration complexity to reduce fabrication and maintainability costs; and (ii) reducing the external aerodynamic drag produced by such IR suppressor systems.

Current suppression systems for rotary wing aircraft are primarily designed to provide significant IR signature reduction during a hover flight profile. Generally speaking, current suppressor systems operate by mixing the high temperature exhaust flow with cool airflow supplied by a mixing duct which communicates with an engine exhaust duct. The mixing of large amounts of ambient air with the engine exhaust may significantly reduce the overall gas temperature prior to discharging the engine exhaust overboard, thereby lowering the aircraft IR signature.

It is also desirable to minimize impingement of hot engine exhaust onto adjacent aircraft structure so that the generation of "hot spots" separate from the primary source associated with the nozzle/exhaust plume are avoided. Disadvantageously, the mixing operation may reduce the velocity of the exhaust flow such that the exhaust velocity may be too low to expel the exhaust far enough from the fuselage to avoid such "hot spots." A further disadvantage is that if the exhaust gas does not have enough velocity to escape rotor downwash, the exhaust gas may be re-ingested into the engine which reduces engine efficiency.

BRIEF DESCRIPTION OF THE DRAWINGS

Referring now to the drawings wherein like elements are numbered alike in the several FIGURES.

DETAILED DESCRIPTION

Figure 1:
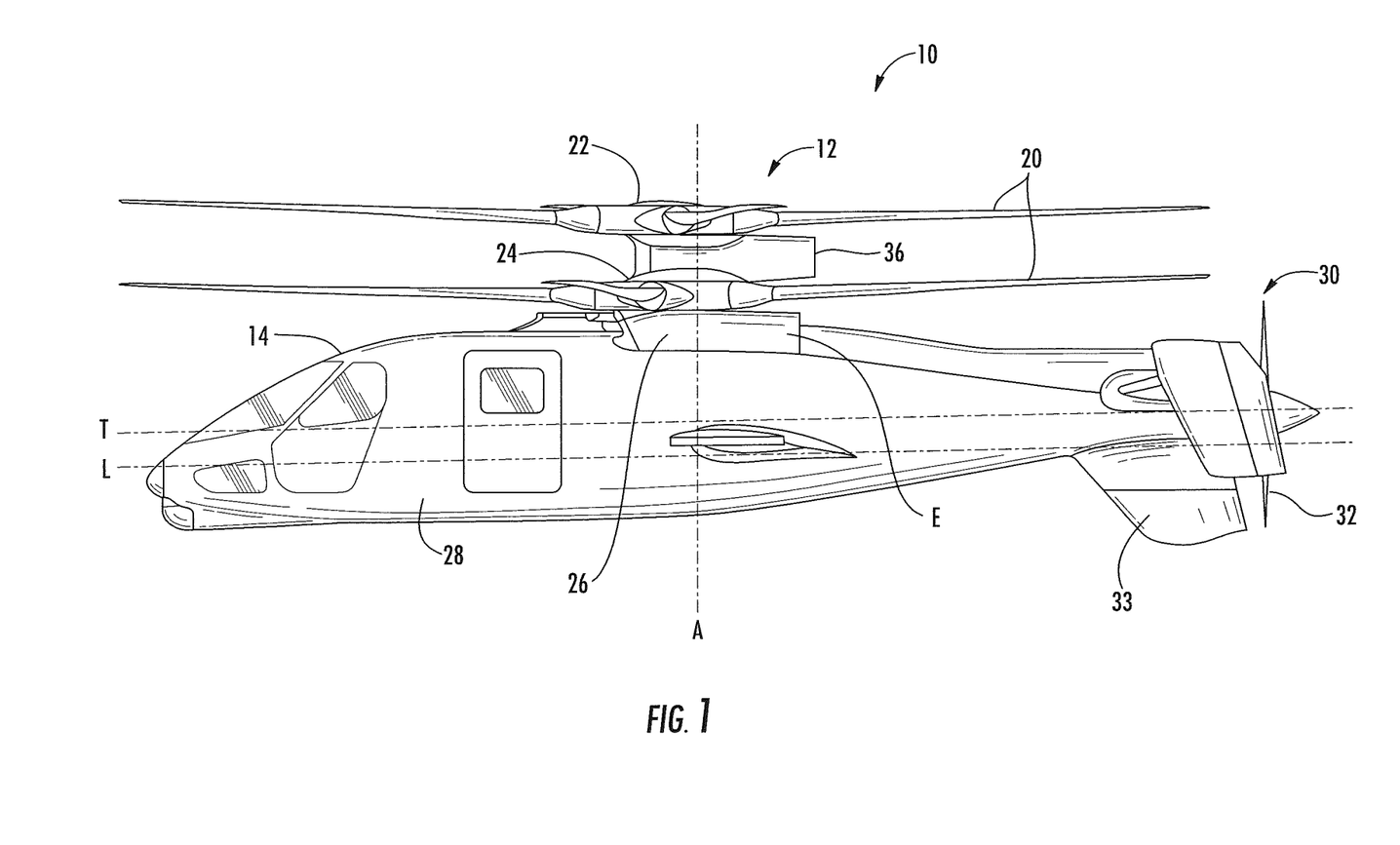
FIG. 1 depicts a rotary wing aircraft in an exemplary embodiment.

FIG. 1 illustrates an exemplary vertical takeoff and landing (VTOL) rotary-wing aircraft 10 having a dual, counter-rotating, coaxial rotor system 12 which rotates about an axis of rotation A. The aircraft 10 includes an airframe 14 which supports the dual, counter rotating, coaxial rotor system 12 as well as an optional translational thrust system 30 which provides translational thrust generally parallel to an aircraft longitudinal axis, L. Although a particular aircraft configuration is illustrated in this non-limiting embodiment, other rotary-wing aircraft will also benefit from embodiments of the invention.

The dual, counter-rotating, coaxial rotor system 12 includes an upper rotor system and a lower rotor system. Rotor system 12 includes a plurality of rotor blades 20 mounted to a rotor hub 22, 24 for rotation about rotor axis of rotation A. A plurality of the main rotor blades 20 project substantially radially outward from the hubs 22, 24. Any number of blades 20 may be used with the rotor system 12. The rotor system 12 includes a rotor hub fairing 36 generally located between and around the upper and lower rotor systems such that the rotor hubs 22, 24 are at least partially contained therein. The rotor hub fairing 36 provides drag reduction.

A main gearbox 26 may be located above the aircraft cabin 28 and drives the rotor system 12. The translational thrust system 30 may be driven by the same main gearbox 26 which drives the rotor system 12. The main gearbox 26 is driven by one or more engines (illustrated schematically at E).

The translational thrust system 30 may be mounted to the rear of the airframe 14 with a translational thrust axis, T, oriented substantially horizontal and parallel to the aircraft longitudinal axis L to provide thrust for high-speed flight. The translational thrust system 30 includes a pusher propeller 32 mounted at an aerodynamic tail fairing 33. The translational thrust axis, T, corresponds to the axis of rotation of propeller 32. Although a tail mounted translational thrust system 30 is disclosed in this illustrated non-limiting embodiment, it should be understood that any such system or other translational thrust systems may alternatively or additionally be utilized.

Figure 2:
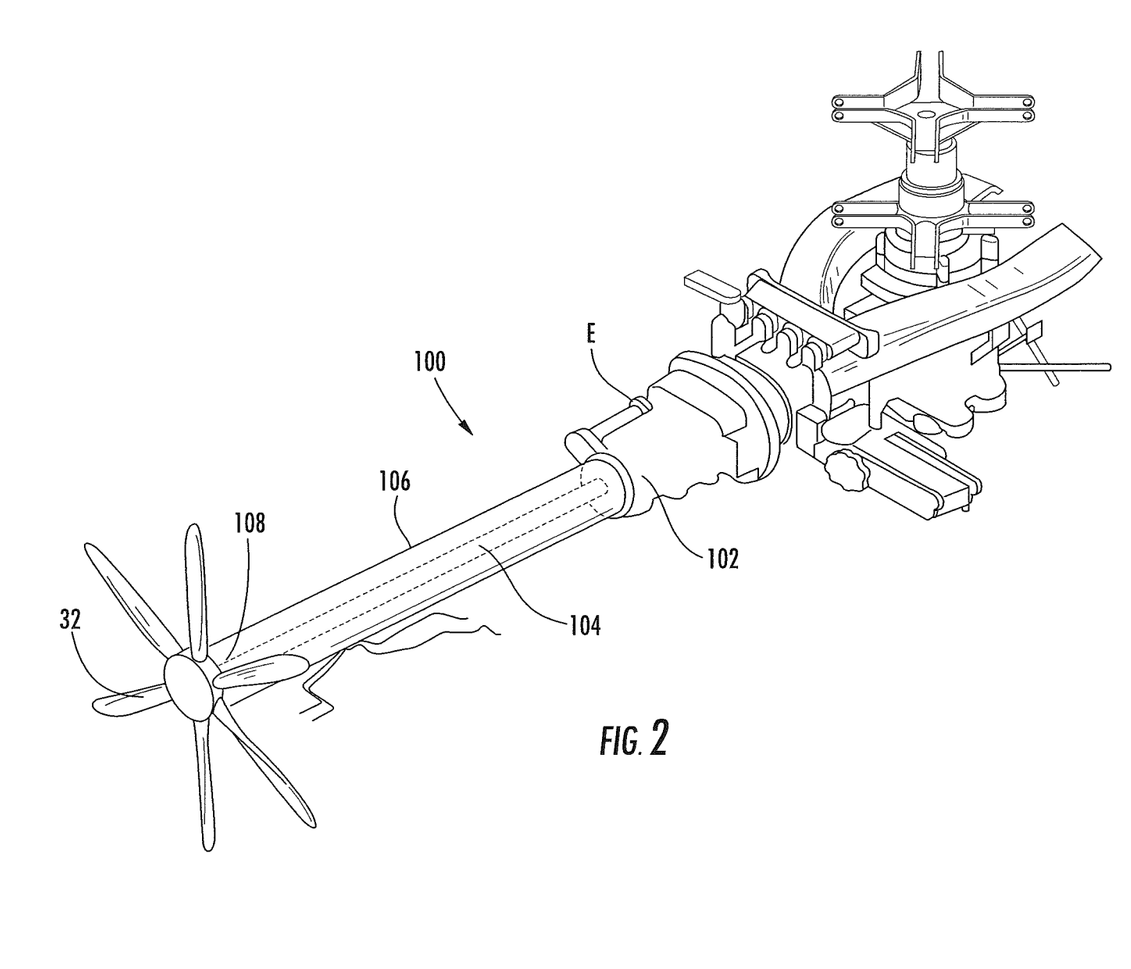
FIG. 2 depicts a collocated exhaust duct and propeller shaft in an exemplary embodiment.

As noted above, exhaust from engine E can increase the IR signature of the aircraft 10, either directly or by impingement on surfaces of the aircraft 10. To reduce exhaust impingement and restrict line of sight to the exhaust, embodiments described herein employ a collocated exhaust duct and propeller shaft to expel an emission containing engine exhaust proximate to the propeller 32 at tail faring 33. FIG. 2 depicts an exhaust system 100 in an exemplary embodiment.

Engine E in FIG. 2 may be a turboshaft engine having an aft facing, aft turbine section 102. As known in the art, exhaust from engine E is outlet at the aft turbine section 102 at an annular opening. An aft facing propeller drive shaft 104 also extends through the aft turbine section 102. Drive shaft 102 is coupled to propeller 32 to rotate propeller 32 about a rotational axis defined by the longitudinal axis of the drive shaft 104.

An exhaust duct 106 is collocated about the drive shaft 104. Exhaust duct 106 is a tubular member having a fore end coupled to the aft turbine section 102 in a fluidly sealed manner. Exhaust from engine E is provided to exhaust duct 106 at an opening at the fore end. Exhaust duct 106 has a longitudinal axis parallel to the longitudinal axis of drive shaft 104. In exemplary embodiments, exhaust duct 106 and drive shaft 104 are concentric. The aft end of exhaust duct 106 has an exhaust opening 108 for emitting exhaust from engine E. The exhaust opening 108 emits exhaust about drive shaft 104 and propeller 32 proximate to tail fairing 33.

Figure 3:
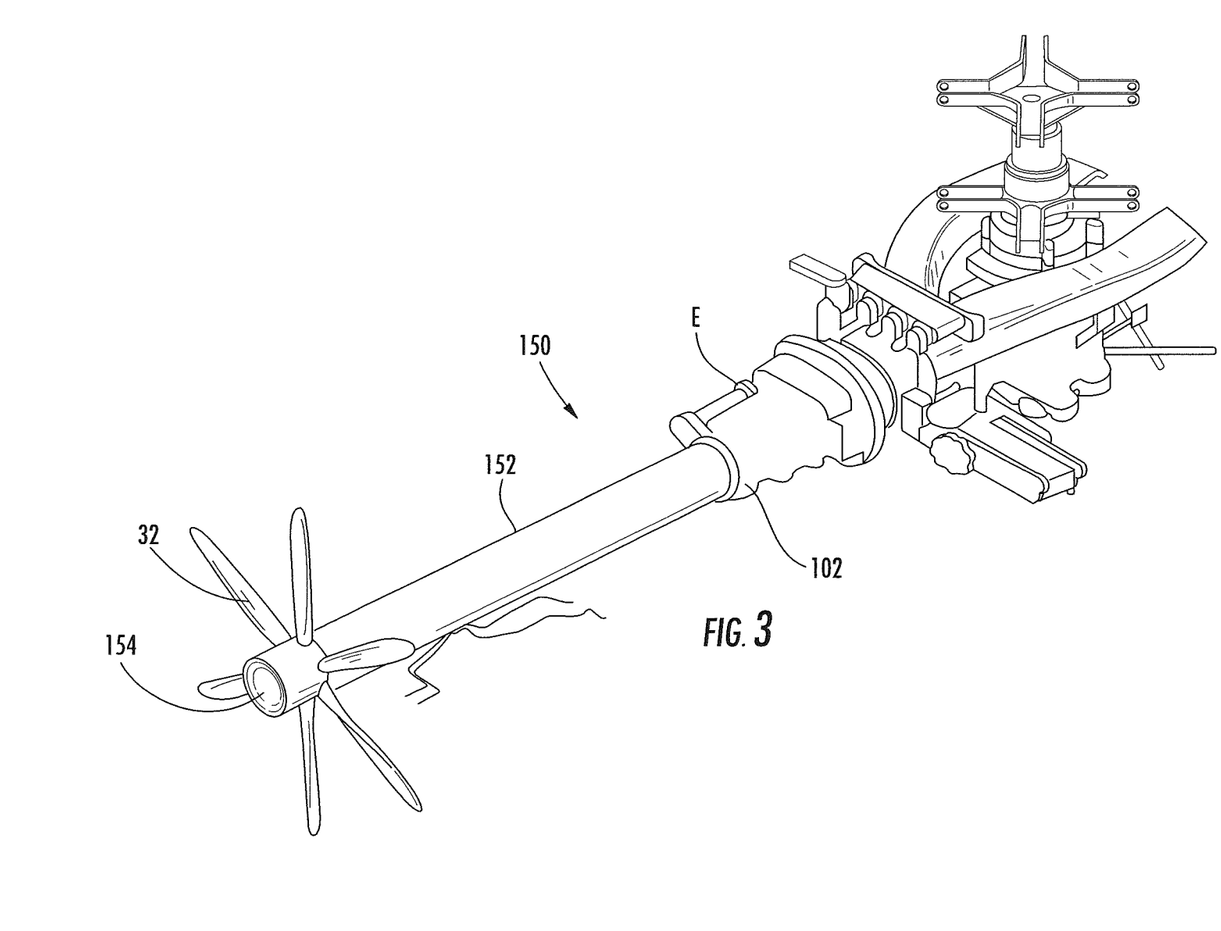
FIG. 3 depicts a collocated exhaust duct and propeller shaft in an exemplary embodiment.

FIG. 3 depicts an exhaust system 150 in an exemplary embodiment. Engine E in FIG. 3 may be a turboshaft engine having an aft facing, aft turbine section 102. As known in the art, exhaust from engine E is outlet at the aft turbine section 102 at an annular opening. In FIG. 3, the drive shaft and exhaust duct are collated into a single component in the form of a transfer duct 152. Transfer duct 152 transfers exhaust from engine E and transfers force from engine E to propeller 32.

Transfer duct 152 has a fore end rotatably coupled to the aft turbine section 102 in a fluidly sealed manner. Exhaust from engine E is provided to transfer duct 152 at an opening at the fore end. The aft end of transfer duct 152 has an exhaust opening 154 for emitting exhaust from engine E. The exhaust opening 154 emits exhaust about propeller 32 proximate to tail fairing 33. Propeller 32 is connected to the transfer duct 152 at the aft end of the transfer duct 152.

Figure 4:
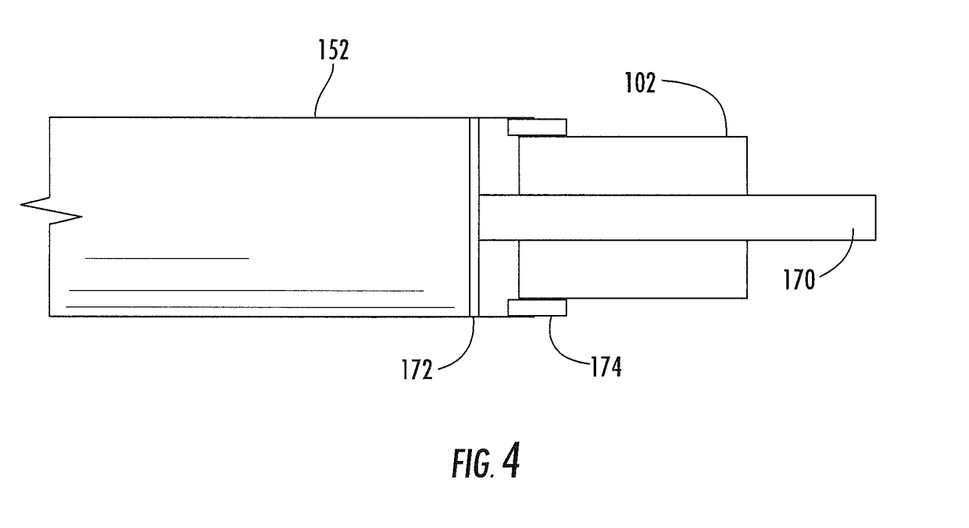
FIG. 4 depicts a connection between a transfer duct and an aft engine section in an exemplary embodiment.

The fore end of transfer duct 152 is also coupled to a drive shaft of engine E. FIG. 4 depicts an exemplary connection between the transfer duct 152 and aft engine section 102. An annular bearing 174 provides a rotational coupling between the transfer duct 152 and aft engine section 102. Bearing 174 also provides a fluid tight seal between transfer duct 152 and aft engine section 102.

Power shaft 170 exits the aft engine section 102 as known in the art and terminates proximate the fore end of transfer duct 152. A spindle 172 is connected to power shaft 170 and extends radially from power shaft 170 to connect to an interior of transfer duct 152. Spindle 172 transfers rotational force from power shaft 170 to transfer duct 152.

Figure 5:
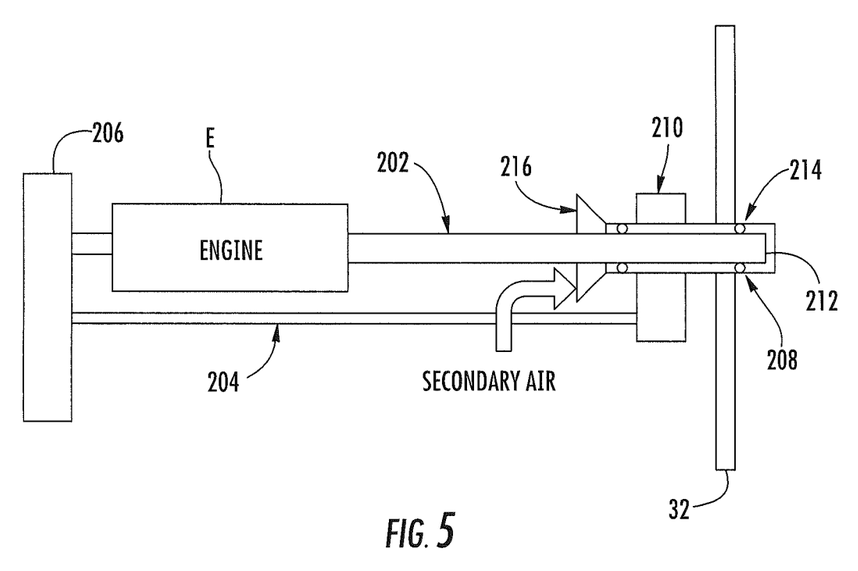
FIG. 5 depicts a collocated exhaust duct and propeller shaft in an exemplary embodiment.

FIG. 5 depicts a collocated exhaust duct and propeller shaft in an exemplary embodiment. In FIG. 5, exhaust from engine E is provided to a stationary exhaust duct 202. Engine E drives a driveshaft 204 through a forward located gearbox 206. Drive shaft 204 drives a propeller driveshaft 208 through propeller gear box 210. Propeller driveshaft 208 is collocated with exhaust duct 202. Exhaust duct 202 has a longitudinal axis parallel to the longitudinal axis of propeller drive shaft 208. In exemplary embodiments, exhaust duct 202 and propeller drive shaft 208 are concentric. The aft end of exhaust duct 202 has an exhaust opening 212 for emitting exhaust from engine E. The exhaust opening 212 emits exhaust about propeller drive shaft 208 and propeller 32 proximate to tail fairing 33. Propeller drive shaft 208 is located externally to the exhaust duct 202. Bearing 214 (e.g., unshielded ceramic bearings) are positioned between exhaust duct 202 and propeller drive shaft 208.

Fan 216 is used to draw second air into a space between exhaust duct 202 and propeller drive shaft 208. The secondary air mixes with exhaust from engine E to cool the exhaust prior to emissions from exhaust opening 212. The exhaust duct 202 may include openings to allow the secondary air to enter an interior of the exhaust duct 202 for missing upstream of the exhaust opening 212.

Secondary air may be used to cool exhaust. A source of secondary air may be introduced to the exhaust at the exhaust opening of the exhaust duct. Alternatively, one or more openings may be provided along the length of the exhaust ducts 106, 152, 202 that allow secondary air to flow into the interior of the exhaust duct and mix with the exhaust prior to emission of the mixed air/exhaust.

Sources of secondary air to cool the exhaust include engine compartment cooling air, IPS air and avionics cooling air. Other internal sources of secondary air include transmission cooling air, hydraulics cooling air, environmental control system (ECS) air and auxiliary power unit (APU) air. The use of internal air sources as the source for the secondary air provides several benefits. Existing aircraft incur significant weight, momentum drag and susceptibility penalties for multiple inlets and exhausts required to support independent cooling of multiple heat sources, including engine, avionics, transmission, hydraulic, environmental control system (ECS) and auxiliary power unit (APU) components. To support the low drag and low weight objectives, embodiments of the invention employ an internally linked thermal management architecture to harness the cooling potential of secondary airflow for primary exhaust cooling. Potential secondary air sources include engine compartment cooling, IPS exhaust, avionics cooling air, transmission oil cooler exhaust, hydraulic oil cooler exhaust, ECS exhaust, and APU exhaust.

Figure 6:
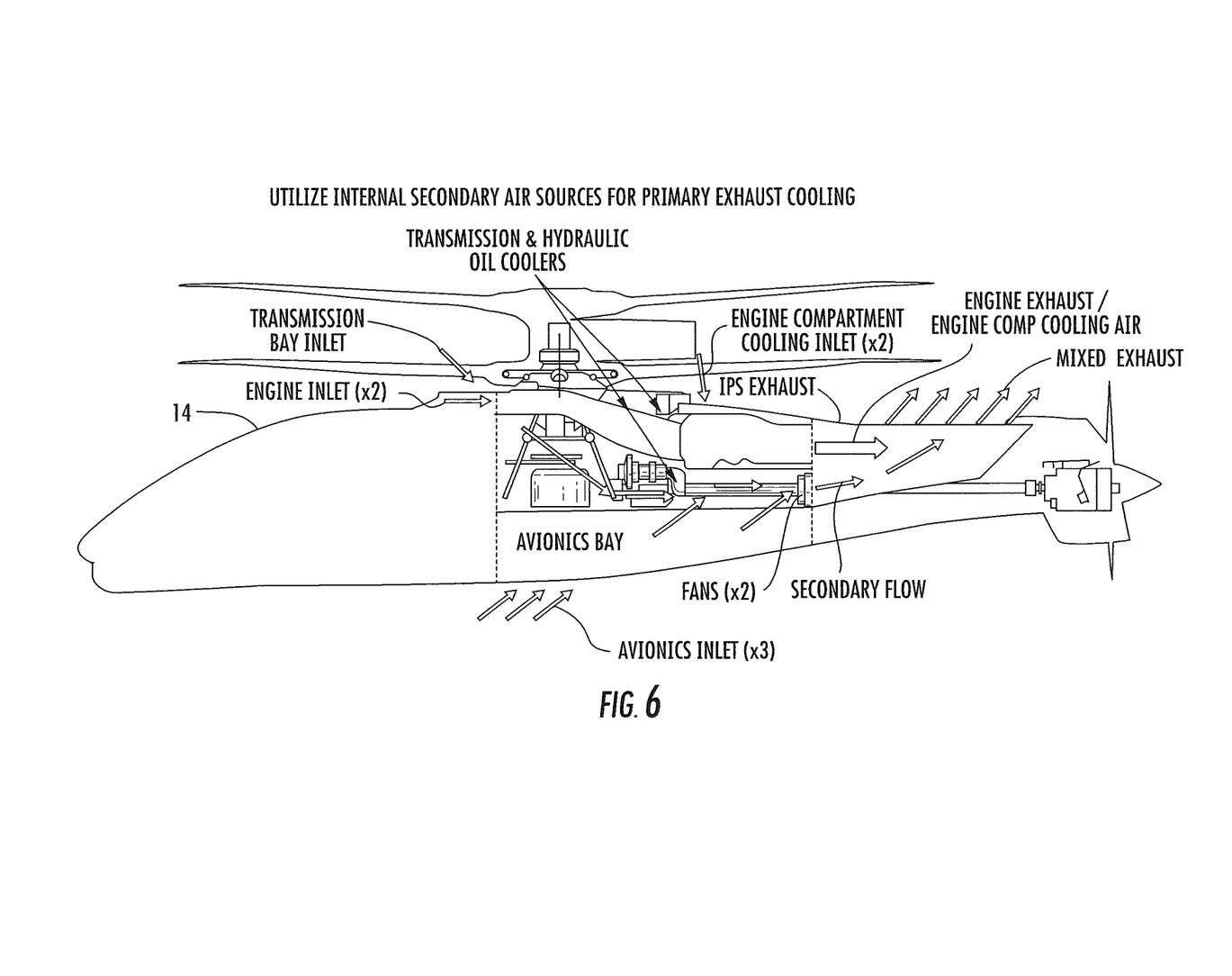
FIG. 6 depicts flow of multiple secondary air sources through an airframe in an exemplary embodiment.

FIG. 6 depicts the flow a multiple secondary air sources through the airframe 14 in an exemplary embodiment. The secondary air is drawn from internal compartments and then mixed with the exhaust from engine E at the exhaust system as described above. Using secondary air from compartments of the airframe 14 reduces or eliminates the need for additional inlets and exhausts, scoops, air rams, etc. This reduces drag on the aircraft and lessens aircraft weight.

Embodiments provide collocated exhaust duct and propeller shaft exhaust system that reduces impingement of exhaust emissions on the aircraft. The tail fairing, or empennage, also serves to block a line sight to the emissions of the exhaust system. The exhaust system releases the exhaust far enough aft to avoid external fuselage impingement by releasing exhaust plume at the rear of the propeller. The exhaust system also reduces drag impact of changes in exhaust vector and velocity.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions, or equivalent arrangement not hereto described will be apparent to those of ordinary skill in the art without departing from the scope and spirit of the invention. Additionally, while the various embodiment of the invention have been described, it is to be understood that aspects of the invention may include only some of the described embodiments. Accordingly, the invention is not to be seen as limited by the foregoing description, but is only limited by the scope of the appended claims.

The invention claimed is:

1. An exhaust system for reducing infrared emissions of a rotary wing aircraft, the exhaust system comprising:
    an exhaust duct having a fore end connected with an aft turbine section of an engine of the rotary wing aircraft in a fluidly sealed manner, the exhaust duct having an aft end having an exhaust opening to expel engine exhaust proximate to a tail fairing of the rotary wing aircraft, the exhaust duct having a central axis extending from the fore end to the aft end; and a drive shaft providing rotational force to an aft propeller of the rotary wing aircraft, at least a portion of the drive shaft being coaxial with the central axis between the fore and aft ends.

2. The exhaust system of claim 1 wherein the drive shaft is internal to the exhaust duct.

3. The exhaust system of claim 1 wherein the drive shaft is external to the exhaust duct.

4. The exhaust system of claim 1 wherein the drive shaft has a longitudinal axis parallel to a longitudinal axis of the exhaust duct.

5. The exhaust system of claim 1 wherein the drive shaft and exhaust duct are concentric.

6. The exhaust system of claim 1 wherein drive shaft and exhaust duct are collocated as a single transfer duct providing both the drive shaft and the exhaust duct as the single transfer duct.

7. The exhaust system of claim 6 further comprising:
an annular bearing for rotatably coupling the fore end of the single transfer duct to the aft turbine section of the engine.

8. The exhaust system of claim 7 wherein the annular bearing provides a seal between the single transfer duct and the aft turbine section of the engine.

9. The exhaust system of claim 6 further comprising:
a spindle coupled to an interior of the single transfer duct, the spindle for connection to a power shaft of the engine.

10. A rotary wing aircraft comprising:
a rotor having a plurality of rotor blades;
an engine for driving the rotor;
a frame supporting a tail fairing;
a propeller mounted at the tail fairing; and
an exhaust system for reducing infrared emissions of the rotary wing aircraft, the exhaust system including:
an exhaust duct having a fore end connected with an aft turbine section of the engine in a fluidly sealed manner, the exhaust duct having an aft end having an exhaust opening to expel engine exhaust proximate to the tail fairing, the exhaust duct having a central axis extending from the fore end to the aft end; and
a drive shaft providing rotational force to the propeller, at least a portion of the drive shaft being coaxial with the central axis between the fore and aft ends.

11. The rotary wing aircraft of claim 10 wherein the drive shaft is internal to the exhaust duct.

12. The rotary wing aircraft of claim 10 wherein the drive shaft is external to the exhaust duct.

13. The rotary wing aircraft of claim 10 wherein the drive shaft has a longitudinal axis parallel to a longitudinal axis of the exhaust duct.

14. The rotary wing aircraft of claim 10 wherein the drive shaft and exhaust duct are concentric.

15. The rotary wing aircraft of claim 10 wherein drive shaft and exhaust duct are collocated as a single transfer duct providing both the drive shaft and the exhaust duct as the single transfer duct.

16. The rotary wing aircraft of claim 15 further comprising:
an annular bearing for rotatably coupling the fore end of the single transfer duct to the aft turbine section of the engine.

17. The rotary wing aircraft of claim 16 wherein the annular bearing provides a seal between the single transfer duct and the aft turbine section of the engine.

18. The rotary wing aircraft of claim 15 further comprising:
a spindle coupled to an interior of the single transfer duct, the spindle connected to a power shaft of the engine.

19. A rotary wing aircraft comprising:
a rotor having a plurality of rotor blades;
an engine for driving the rotor;
a frame supporting a tail;
a propeller mounted at the tail;
an exhaust duct having a fore end connected with an aft turbine section of the engine in a fluidly sealed manner, the exhaust duct having an aft end having an exhaust opening to expel engine exhaust proximate to the tail;
a drive shaft;
a gearbox transferring force from the engine to the drive shaft;
a propeller gear box coupled to the drive shaft;
a propeller drive shaft coupled to the propeller gear box, the propeller gear box transferring force from the drive shaft to the propeller drive shaft;
wherein the exhaust duct is located internal to the propeller drive shaft.

20. The rotary wing aircraft of claim 19 further comprising:
a bearing positioned between the propeller drive shaft and the exhaust duct.

21. The rotary wing aircraft of claim 19 further comprising:
a fan configured to draw air into a space between the propeller drive shaft and the exhaust duct.

* * * * *